(12) United States Patent
Lan et al.

(10) Patent No.: US 9,008,195 B2
(45) Date of Patent: Apr. 14, 2015

(54) DETECTION OF A PACKET TYPE IN A COMMUNICATIONS SYSTEM

(75) Inventors: Cheng-Chou Lan, Los Angeles, CA (US); Cimarron Mittelsteadt, Santa Clarita, CA (US)

(73) Assignee: ViXS Systems, Inc., Toronto, Ontario (CA)

( * ) Notice: Subject to any disclaimer, the term of this patent is extended or adjusted under 35 U.S.C. 154(b) by 441 days.

(21) Appl. No.: 13/346,060

(22) Filed: Jan. 9, 2012

(65) Prior Publication Data
US 2013/0177088 A1 Jul. 11, 2013

(51) Int. Cl.
*H04L 27/00* (2006.01)
*H04L 27/26* (2006.01)
*H04L 7/033* (2006.01)
*H04L 7/04* (2006.01)
*H04L 1/00* (2006.01)

(52) U.S. Cl.
CPC .............. *H04L 27/00* (2013.01); *H04L 27/261* (2013.01); *H04L 27/2647* (2013.01); *H04L 27/2656* (2013.01); *H04L 1/004* (2013.01); *H04L 7/0331* (2013.01); *H04L 7/041* (2013.01)

(58) Field of Classification Search
CPC .... H04L 1/0038; H04L 12/1822; H04L 7/042
USPC ......................................................... 375/259
See application file for complete search history.

(56) References Cited

U.S. PATENT DOCUMENTS

| | | | | |
|---|---|---|---|---|
| 5,225,847 A | * | 7/1993 | Roberts et al. | 343/745 |
| 6,130,920 A | * | 10/2000 | Powell et al. | 375/343 |
| 6,246,735 B1 | * | 6/2001 | Sano et al. | 375/364 |
| 8,332,219 B2 | * | 12/2012 | Lin et al. | 704/233 |

OTHER PUBLICATIONS

CTE Implication Paper, "The Challenges and Rewards of MoCA Deployment for the Home Network," An Implication paper prepared for the Society of Cable Telecommunications Engineers by Spirent Communications, http://mocalliance.org/marketing/white_papers/Spirent_white_paper.pdf, pp. 1-29, downloaded Aug. 30, 2011.
Litwin, Louis, "Matched filtering and timing recovery in digital receivers," RF time and frequency, Sep. 2001, pp. 32, 36, 40, 42, 44, 46, and 48.
Ovadia, Shlomo, "Home Networking on Coax for Video and Multimedia," Overview for IEEE 802.1AVB, Multimedia over COAX Alliance, May 30, 2007, pp. 1-15.

* cited by examiner

*Primary Examiner* — Lihong Yu
(74) *Attorney, Agent, or Firm* — Abel Law Group, LLP

(57) ABSTRACT

A technique detects the presence of a packet identification sequence in a received sequence of samples received over a communications network. The packet identification sequence, when present and properly detected in a received packet, is used to determine a particular type of the received packet from a plurality of packet types that may be received over the communications network. The technique for detecting the packet identification sequence includes detecting a null sequence in the received packet and a predetermined identification sequence in the packet. Detection of the predetermined sequence uses energy estimates for corresponding windows of received samples.

19 Claims, 9 Drawing Sheets

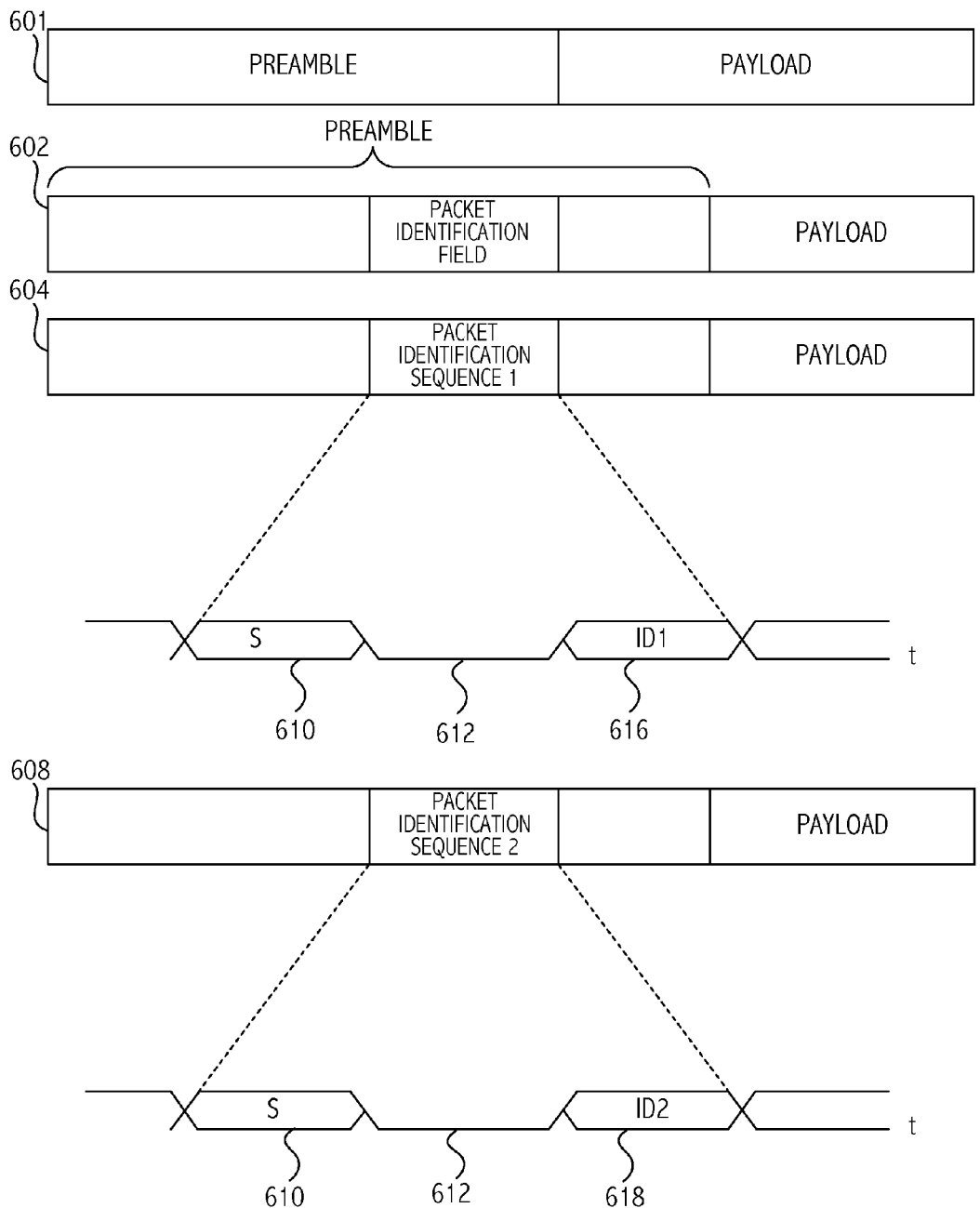
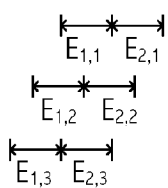
FIG. 6
FIG. 7

US 9,008,195 B2

DETECTION OF A PACKET TYPE IN A COMMUNICATIONS SYSTEM

BACKGROUND

1. Field of the Invention

The present invention relates to communications systems, and more particularly, packet communications systems.

2. Description of the Related Art

In a packet-based communications system, a packet is a bundle of data organized in a particular format for transmission. A typical packet includes a header or preamble portion and a payload portion. In general, the preamble portion facilitates delivery of the payload, which is the part of the transmitted data that is the purpose of the transmission. A communications system protocol typically specifies multiple types of packets that have different formats and/or functions (e.g., packets that communicate payload data, packets that communicate training information, etc.). Accurate determination of a type of a packet received by a receiver facilitates proper processing of the contents of the packet. Accordingly, a robust technique for detecting a type of a received packet is desired.

SUMMARY OF EMBODIMENTS OF THE INVENTION

In at least one embodiment of the invention, a method includes generating an indicator of detection of a predetermined sequence in a sequence of received samples based on a first energy estimate corresponding to a first sequence of received samples, a second energy estimate corresponding to a second sequence of received samples, a first threshold level, a second threshold level, and a plurality of predetermined sequences. In at least one embodiment of the method, the first sequence of received samples and the second sequence of received samples are consecutive sequences of the received samples. In at least one embodiment of the method, the indicator indicates a packet type of a packet including one of the plurality of predetermined sequences, the packet type being one of a corresponding plurality of packet types. In at least one embodiment of the method, the predetermined sequence includes a null sequence and one of a plurality of second predetermined sequences.

In at least one embodiment of the invention, an apparatus includes a first detection circuit configured to generate a first indicator indicating detection of a first predetermined sequence of a plurality of predetermined sequences in a sequence of received samples. The first indicator is generated in response to a second indicator indicating presence of the first predetermined sequence in the sequence of received samples and based on a plurality of second predetermined sequences. The apparatus includes a second detection circuit configured to generate the second indicator in response to detection of a null sequence in the sequence of received samples. The null sequence is detected based on a first energy estimate corresponding to a first sequence of received samples, a second energy estimate corresponding to a second sequence of received samples, a first threshold level, and a second threshold level.

BRIEF DESCRIPTION OF THE DRAWINGS

The present invention may be better understood, and its numerous objects, features, and advantages made apparent to those skilled in the art by referencing the accompanying drawings.

FIG. 6 illustrates a format of packets of the communications network of FIG. 1.

FIG. 7 illustrates received samples and first and second windows of received samples consistent with at least one embodiment of the invention.

The use of the same reference symbols in different drawings indicates similar or identical items.

DETAILED DESCRIPTION

A technique detects the presence of a packet identification sequence in a received sequence of samples received over a communications network. The packet identification sequence, when present and properly detected in a received packet, is used to determine a particular type of the received packet (e.g., an access type of a packet) from a plurality of packet types that may be received over the communications network. The technique for detecting the packet identification sequence includes detecting a null sequence in the received packet and a predetermined identification sequence in the packet based on energy estimates for corresponding windows of received samples.

Figure 1:
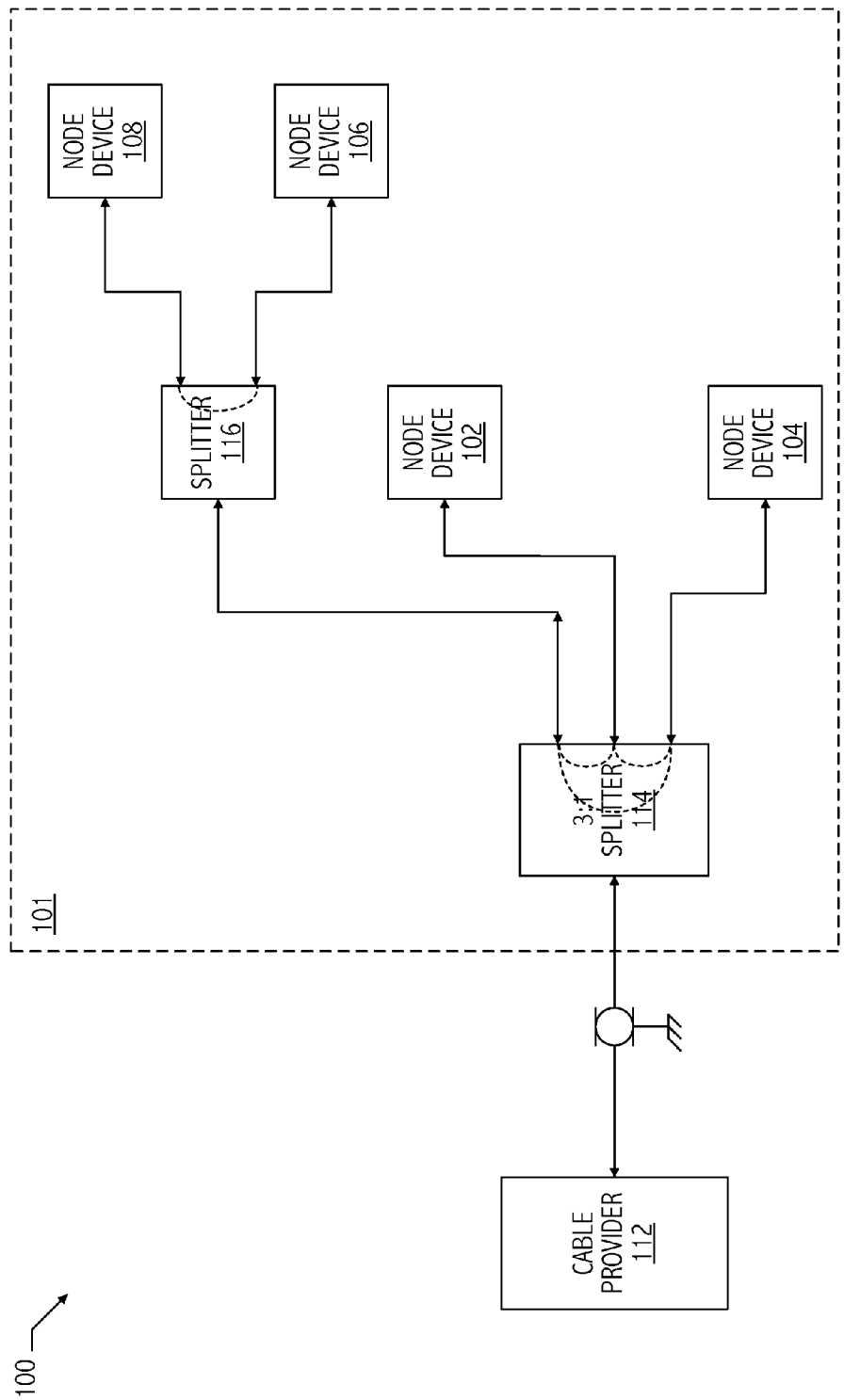
FIG. 1 illustrates a functional block diagram of an exemplary communications network.

Referring to FIG. 1, in an exemplary digital communications network (e.g., network 100) nodes (e.g., nodes 102, 104, 106, and 108) and splitters (e.g., splitters 114 and 116) are configured as a local area network (e.g., network 101) using communications over a channel (e.g., coaxial cables). In at least one embodiment of network 100, nodes 102, 104, 106, and 108 communicate with a wide-area network (e.g., cable provider 112) via splitter 114 and/or splitter 116. In addition, in at least one embodiment of network 100, nodes 102, 104, 106, and 108 communicate with each other via splitter jumping.

Note that due to effects of splitter jumping and reflections at different terminations of network 101, channel characteristics (e.g., attenuation and delay) for a link between two nodes may be different from the channel characteristics for a link between two other nodes. In addition, channel characteristics in a forward path may be different from channel characteristics in a reverse path. Thus, channel capacity between each source node and destination node varies from the channel capacity for two other source nodes and destination nodes.

Figure 2:
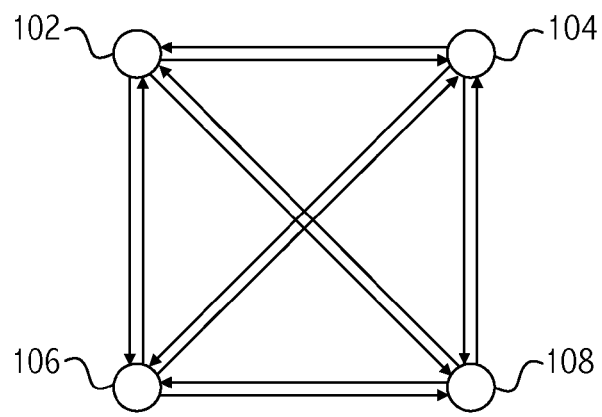
FIG. 2 illustrates an exemplary logical topology of node devices of the communications network of FIG. 1.

Accordingly, to appropriately use the channel capacity of network 101, individual nodes of network 101 determine and store suitable separate physical (PHY) parameters tailored for each link (i.e., store separate PHY profiles for each link). Referring to FIG. 2, a logical model of network 101 is a fully-meshed collection of point-to-point links. Each link has unique channel characteristics and capacity. In addition to point-to-point communications, network 101 supports broadcast and multicast communications in which a source node uses a common set of PHY parameters that may be received by all destination nodes.

In at least one embodiment of network 101, nodes 102, 104, 106, and 108 share a physical channel. Thus, only one node is allowed to transmit at a particular time. For example, the physical channel is time division-multiplexed and coordinated by a Media Access Control (MAC) data communication protocol sublayer using time division multiple access (TDMA). In at least one embodiment, network 101 is a centrally coordinated system with one node being a network-coordinator (NC). A node that is the NC transacts data on the network like any other node, but is also responsible for transmitting beacons to advertise network presence and timing, coordinating a process for admitting nodes to the network, scheduling and coordinating transmission of data among all nodes in the network, scheduling and coordinating link-maintenance operations (e.g., operations during which nodes update their physical profiles), and other functions.

In at least one embodiment of node 102, a cyclic prefix is concatenated with modulated symbols to form an Adaptive Constellation Multi-tone (ACMT) symbol. For example, one ACMT symbol is formed by copying and prepending a number of last samples (i.e., cyclic prefix samples ($N_{CP}$)) of an inverse first Fourier transform (IFFT) output (N samples), resulting in an output symbol having $N+N_{CP}$ samples. Multiple ACMT symbols are concatenated to form a packet. In general, a receiver is configured to discard the cyclic prefix samples. However, the cyclic prefix serves two purposes. First it serves as a guard interval that reduces or eliminates intersymbol interference from a previous symbol. Secondly, the cyclic prefix facilitates modeling linear convolution of a frequency-selective multipath channel as circular convolution, which in turn may be transformed to the frequency domain using a discrete Fourier transform. This approach allows for simple frequency-domain processing, such as for channel estimation, equalization, and demapping and recovery of the transmitted data bits. The length of the cyclic prefix is chosen to be at least equal to the length of the multipath channel.

Figure 3:
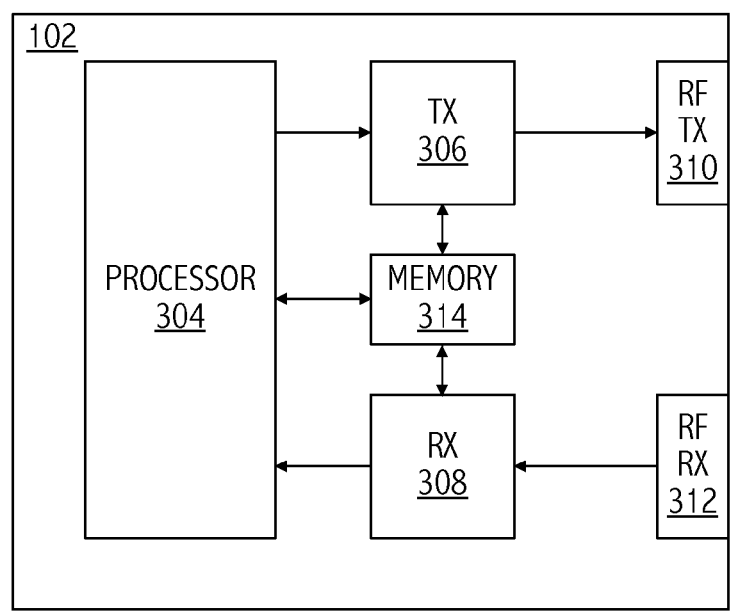
FIG. 3 illustrates a functional block diagram of an exemplary node device of the communications network of FIG. 1.

Referring to FIG. 3, an exemplary node 102 includes a processor configured to generate and process data communicated over network 101. Data to be transmitted over the network is digitally processed in transmitter 306 (e.g., using memory 314) and transmitted over the channel using RF transmitter 310. In at least one embodiment, node 102 includes a radio frequency receiver configured to receive analog signals over the channel and to provide a baseband analog signal to the receiver path (e.g., receiver 308), which digitally processes the baseband signal (e.g., using memory 314) to recover data and control information symbols and provide it to processor 304.

In at least one embodiment, node 102 implements orthogonal frequency division multiplexing (OFDM). In general, OFDM is a frequency-division multiplexing scheme utilized as a digital multi-carrier modulation method in which a large number of orthogonal subcarriers having closely-spaced frequencies are used to carry data. The data is divided into several parallel data streams or channels (i.e., frequency bins or bins), one for each subcarrier. Each subcarrier is modulated with a conventional modulation scheme (e.g., quadrature amplitude modulation or phase shift keying) at a low symbol rate, maintaining total data rates similar to conventional single-carrier modulation schemes in the same bandwidth. In at least one embodiment of node 102, the physical interface (e.g., transmitter 306 and receiver 308) utilizes Adaptive Constellation Multi-tone (ACMT), i.e., node 102 pre-equalizes modulation to the frequency response of each link using bit loaded OFDM. In addition, channel profiling techniques tailor the modulation for each link. In at least one embodiment of node 102, physical layer channels are approximately 50 MHz wide (i.e., the ACMT sampling rate is approximately 50 MHz) and the total number of OFDM subcarriers is 256. However, other sampling rates and numbers of subcarriers may be used. In at least one embodiment of node 102, due to DC and channel edge considerations, only 224 of the 256 subcarriers are available for typical communications.

In at least one embodiment of node 102, a modulation profile is generated based on probe packets sent between nodes and analyzed at the receiving nodes. After analysis, a receiving node assigns numbers of bits to subcarriers for a particular link and communicates this information to node 102. An individual ACMT subcarrier may be active or inactive (i.e., turned off). An active ACMT subcarrier is configured to carry one to eight bit Quadrature Amplitude Modulation (QAM) symbols. In at least one embodiment of node 102, transmit power of a sending node is dynamically adjusted based on modulation profiling using the probe packets and based on link performance.

In general, the channel is time-varying and link maintenance operations (LMOs) facilitate the recalculation of PHY parameters. Thus, at regular intervals a transmitting node sends one or more probe packets which are received and analyzed by receiving nodes. The receiving nodes send back probe reports to the corresponding transmitting nodes. Those probe reports may include updated parameters. In at least one embodiment of node 102, each probe packet includes a preamble and a payload. In at least one embodiment of node 102, multiple probe types are used for characterization of different network elements. In at least one embodiment of node 102, probe and/or payload packets include a preamble that includes one or more symbols used for channel estimation.

Figure 4:
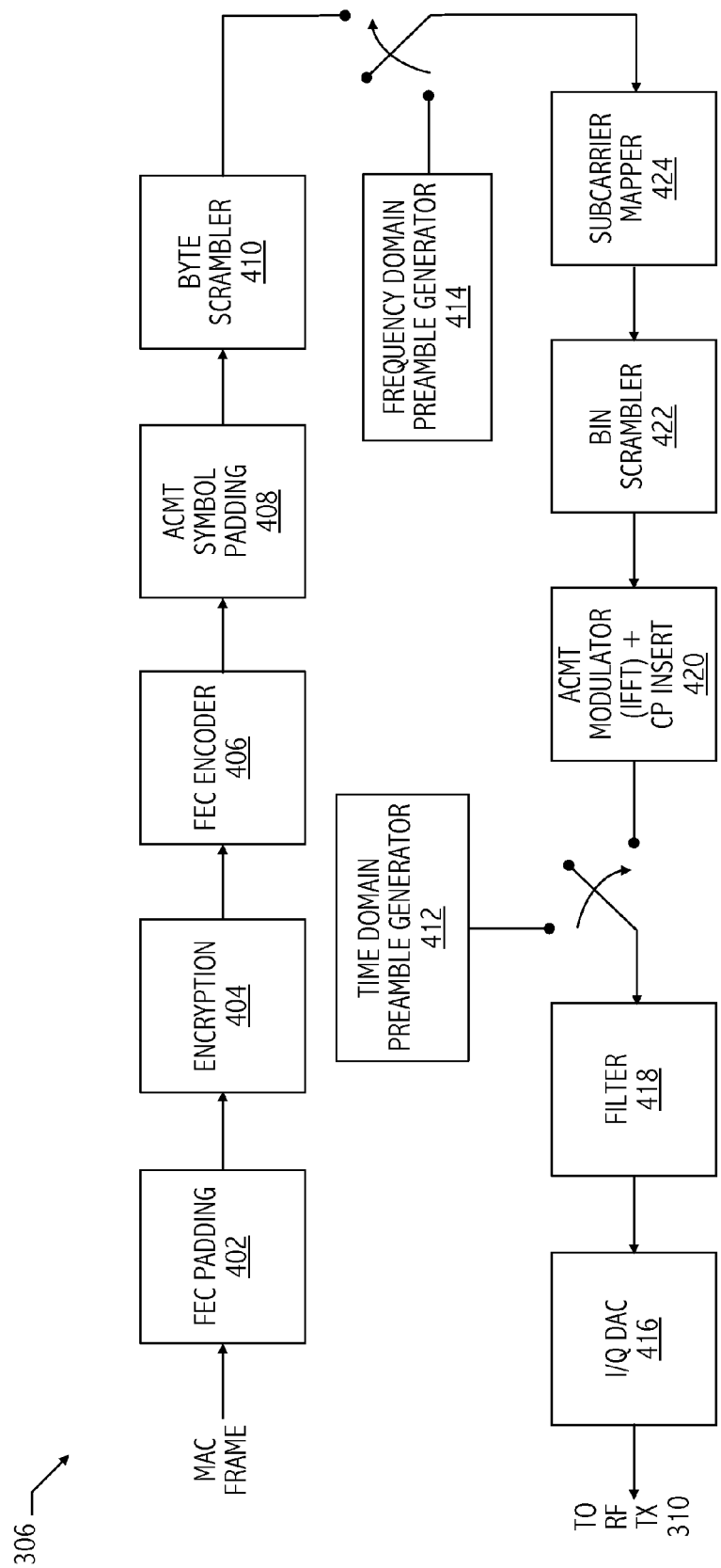
FIG. 4 illustrates a functional block diagram of an exemplary transmitter path of the node device of FIG. 3 consistent with at least one embodiment of the invention.

Referring to FIG. 4, in at least one embodiment, transmitter 306 receives a frame of data from a Medium Access Control data communication protocol sub-layer (i.e., MAC layer). In at least one embodiment of transmitter 306, a channel coding module (e.g., FEC padding module 402) pads bytes so that the FEC encoder receives the required number of bits. In at least one embodiment of transmitter 306, an encryption module (e.g., encryption module 404) encrypts the frame to deter eavesdropping and provide link layer privacy. In at least one embodiment, encryption module 404 implements 56 bit Data Encryption Standard (DES) encryption using a privacy key generated and received from the NC. However, in other embodiments of transmitter 306, other encryption techniques may be used.

In at least one embodiment of transmitter 306, an encoder (e.g., forward error correction (FEC) encoder 406) encodes the frame using up to two different Reed-Solomon block sizes. All codewords except the last are coded with the maximum Reed-Solomon block size, while the last block may be coded using a shorter block size to reduce the FEC padding. FEC encoder 406 encodes the frame with redundancies using a predetermined algorithm to reduce the number of errors that may occur in the message and/or allow correction of any errors without retransmission. Note that in other embodiments of transmitter 306, other types of forward error correction are used (e.g., other block codes or convolutional codes). In at least one embodiment of transmitter 306, a padding module (e.g., ACMT symbol padding module 408) inserts additional bits into the data to form symbols having a particular ACMT symbol size. In at least one embodiment of transmitter 306, a scrambler module (e.g., byte scrambler 410) scrambles each transmitted data byte to change the properties of the transmitted data stream. For example, byte scrambler 410 facilitates data recovery by reducing dependence of the signal power spectrum on the actual transmitted data and/or reducing or eliminating occurrences of long sequences of '0' or '1' that may otherwise cause saturation of digital circuitry and corrupt data recovery. In at least one embodiment of transmitter 306, an ACMT subcarrier mapping module (e.g., subcarrier mapper 424) maps bits of data to ACMT subcarriers according to a predetermined bit loading profile (e.g., a bit loading profile received from a receiving node and stored in memory). In at least one embodiment of transmitter 306, the predetermined profile is selected from a plurality of predetermined profiles according to a particular mode or packet type (e.g., beacon mode, diversity mode, Media Access Plan (MAP), unicast, or broadcast) and link for transmission (e.g., a profile stored for a particular receiving node).

In at least one embodiment of transmitter 306, a scrambler module (e.g., bin scrambler 422) scrambles the data of the ACMT subcarriers to change the properties of the transmitted data stream (e.g., reduce dependence of the signal power spectrum on the actual transmitted data or to reduce or eliminate occurrences of long sequences of '0' or '1') to properties that facilitate data recovery. A modulator (e.g., ACMT modulator 420) generates the time domain in-phase and quadrature (i.e., I and Q) components corresponding to the OFDM signal. ACMT modulator 420 includes an N-point IFFT and inserts a cyclic prefix to the modulated data (i.e., inserts the cyclic prefix to time domain symbols). For example, ACMT modulator 420 copies the last $N_{CP}$ samples of the IFFT output (e.g., N samples) and prepends those samples to the IFFT output to form an OFDM symbol output (e.g., $N+N_{CP}$ samples). The cyclic prefix is used as a guard interval to reduce or eliminate intersymbol interference from a previous symbol and also to facilitate linear convolution of the channel to be modeled as a circular convolution, which may be transformed to the frequency domain using a discrete Fourier transform. This approach allows for simple frequency-domain processing, such as for channel estimation, equalization, and demapping and recovery of transmitted data. The length of the cyclic prefix is chosen to be at least equal to the length of the multipath channel. In at least one embodiment of transmitter 306, filter 418 limits the frequency band of the signal to a signal having a particular spectral mask prior to digital-to-analog conversion (e.g., by digital-to-analog converter 416) and any frequency modulation to a higher frequency band (e.g., from baseband to one of four frequency bands in the range of 850 MHz to 1525 MHz at 25 MHz increments) for transmission.

Depending upon a particular communication type, in at least one embodiment of transmitter 306, frequency domain preamble generator 414 or time domain preamble generator 412 inserts a preamble into the packet prior to processing a MAC frame of data. For example, rather than processing a MAC frame through the portion of the transmitter path including FEC padding module 402, encryption module 404, FEC encoder 406, ACMT symbol padding module 408, and byte scrambler 410, an alternate source (e.g., frequency domain preamble generator 414) provides a plurality of frequency domain preamble symbols, including one or more frequency domain symbols (e.g., which are generated or retrieved from a storage device) to subcarrier mapper 424. Subcarrier mapper 424 maps bits of those frequency domain preamble symbols to individual subcarriers. Those frequency domain preamble symbols are then processed by the remainder of transmitter 306 (e.g., bit scrambled, ACMT modulated, filtered, and converted to an analog signal) and sent to RF TX 310 for transmission. The frequency domain preamble symbols provide a reference signal that may be used by the receiver for timing and frequency offset acquisition, receiver parameter calibration, and PHY payload decode. In at least one embodiment of transmitter 306, frequency domain preamble generator 414 provides a plurality of channel estimation frequency domain symbols (e.g., two channel estimation symbols) to other portions of transmitter 306 (e.g., subcarrier mapper 424, ACMT modulator 420, filter 418, and DAC 416). In at least one embodiment of transmitter 306, time domain preamble generator 412 inserts a plurality of time domain symbols directly to filter 418 for digital-to-analog conversion and then transmission over the link. The time domain preamble symbols provide a reference signal that may be used by the receiver to identify packet type and for symbol timing and frequency offset acquisition.

Figure 5:
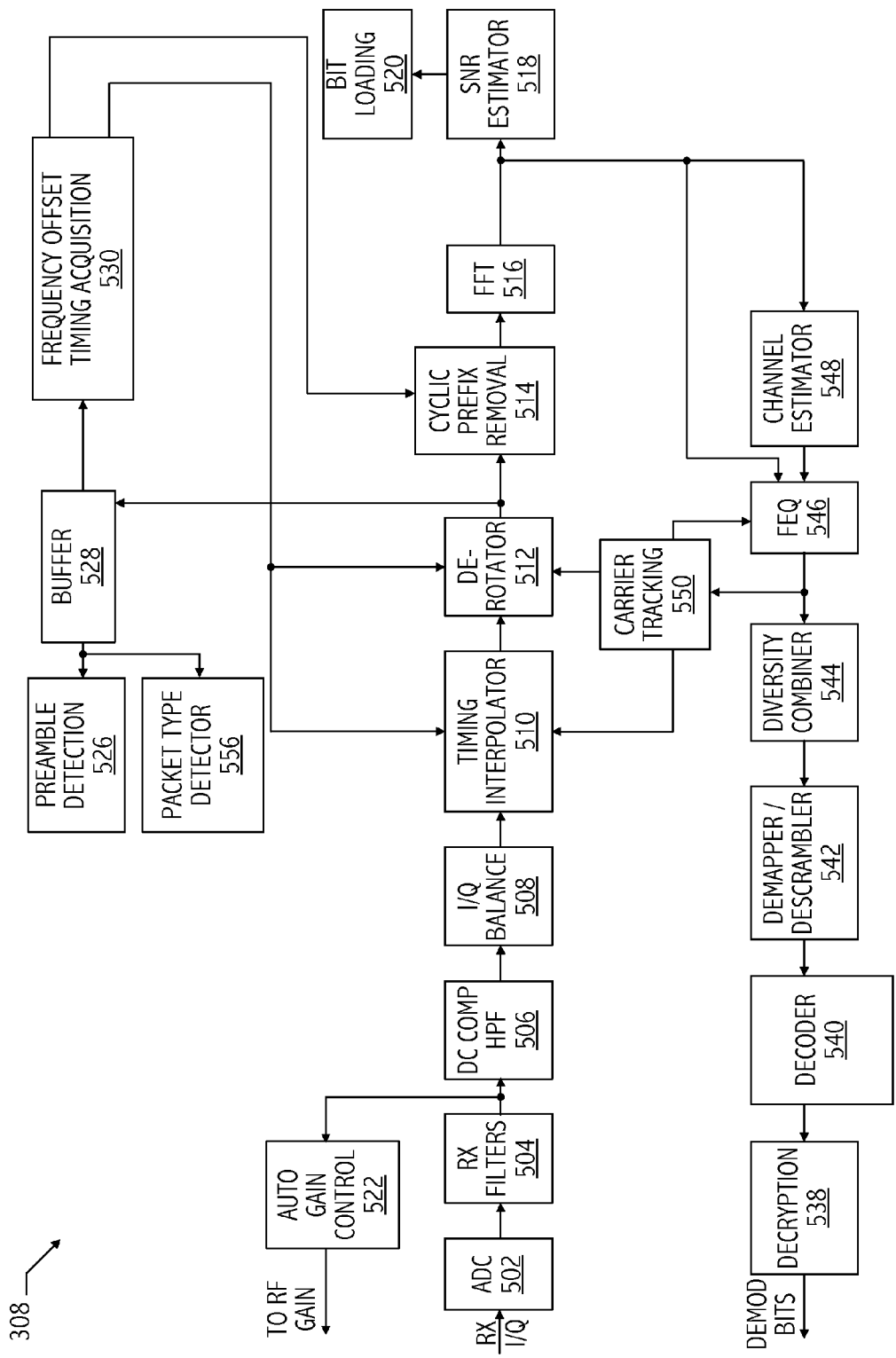
FIG. 5 illustrates a functional block diagram of an exemplary receiver path of the node device of FIG. 3 consistent with at least one embodiment of the invention.

Referring to FIG. 5 in at least one embodiment, receiver 308 receives an analog signal from the RF receiver interface (e.g., RF receiver 312 of FIG. 3) and analog-to-digital converter (e.g., ADC 502) converts in-phase and quadrature analog signal components of the received signal into a complex digital signal. Referring back to FIG. 5, in at least one embodiment of receiver 308, one or more filters (e.g., RX filters 504) limit the complex digital signal to a baseband signal having a particular bandwidth. In at least one embodiment of receiver 308, one or more other filters (e.g., high-pass filter 506) attenuates or removes a DC component of the complex digital signal. In at least one embodiment of receiver 308, I/Q balance module 508 adjusts the real and imaginary components of the complex baseband signal, which are balanced at the transmitting node, but become unbalanced after transmission over the channel by analog circuitry and due to any imbalance introduced by RF receiver 312. I/Q balance module 508 adjusts the in-phase and quadrature components of the complex baseband signal to have approximately the same gain and/or phase. In at least one embodiment of receiver 308, a timing module (e.g., timing interpolator module 510) adjusts the sample timing based on a timing offset, e.g., by using a delay filter to interpolate samples and generate an output sample having a particular timing based on the timing offset. In at least one embodiment of receiver 308, a frequency offset correction module (e.g., de-rotator module 512) compensates for any frequency offset e.g., by performing a complex multiply of the received data with a complex data value based on a previously determined target angle of rotation that compensates for the frequency offset. In at least one embodiment of receiver 308, a module (e.g., cyclic prefix removal module 514) strips a number of samples (e.g., $N_{CP}$ samples, where $N_{CP}$ is the number of samples inserted by the transmitter as the cyclic prefix) from the de-rotated data symbol and provides the resulting time domain symbol to a demodulator (e.g., fast Fourier transform (FFT) module 516), which generates frequency domain symbols.

In at least one embodiment of receiver 308, during channel estimation sequences (e.g., during receipt of symbols of a probe signal) a signal-to-noise ratio (SNR) estimator (e.g., SNR estimator 518) generates an SNR estimate based on multiple frequency domain symbols. A bit loading module (e.g., bit loading module 520) assigns a number of bits for transmission over individual subcarriers of the OFDM channel based on the SNR estimate. For example, bit loading module 520 turns off an individual subcarrier or assigns a one to eight bit QAM symbol to the individual subcarrier. In general, bit loading module 520 generates a bit allocation for each subcarrier of an OFDM signal and receiver 308 communicates those bit loading assignments to a transmitting node for a particular link for generating packets for communication during data communications intervals. In addition, the resulting bit loading is stored in receiver 308 for data recovery during subsequent communications sequences.

In at least one embodiment of receiver 308, during data demodulation and decode sequences, a frequency domain equalizer (e.g., FEQ 546) reduces effects of a bandlimited channel using frequency domain equalizer taps generated by a channel estimation module (e.g., channel estimator 548), as described further below. In at least one embodiment of receiver 308, during data demodulation and decode sequences that communicate in a diversity mode (e.g., a mode in which the same signal is transmitted by multiple subcarriers) diversity combiner module 544 combines signals repeated on multiple subcarriers into a single improved signal (e.g., using a maximum ratio combining technique). In at least one embodiment of receiver 308, frequency domain symbols are demapped from the subcarriers and descrambled (e.g., using demapper/descrambler module 542) according to a technique consistent with the mapping and scrambling technique used on a transmitting node. The demapped and descrambled bits are decoded (e.g., using decoder 540) consistent with coding used by a transmitting node. A decryption module (decryptor 538) recovers demodulated bits and provides them to a processor for further processing.

In at least one embodiment of receiver 308, carrier tracking module 550 uses a pilot subcarrier ($n_P$) that carries known training data to synchronize the frequency and phase of the receiver clock with the transmitter clock. A typical pilot tone transmitted from the source node has only a real component (i.e., the imaginary component is zero), and the imaginary part of the complex output of subcarrier $n_P$ from the FFT is input to a feedback loop on the receiver. That feedback loop is configured to adjust the receive clock signal to drive to zero the recovered imaginary part of the pilot tone. The imaginary part of the complex output of subcarrier $n_P$ from the FFT is input to a loop filter, which via a digital-to-analog converter delivers a digital control signal to de-rotator 512 and timing interpolator 510. However, in other embodiments of receiver 308, the output of the loop filter is a control voltage that is provided to a VCXO that adjusts the frequency of the receive clock. In at least one embodiment of receiver 308, rather than dedicating one or more subcarriers to being pilot tones that carry known data, a carrierless tracking technique is used to generate an indicator of frequency offset that is used to adjust the frequency of the receive clock.

In general, FEQ 546 reduces effects of the bandlimited channel by equalizing the channel response. In at least one embodiment of receiver 308, a payload packet received over a particular link includes a preamble portion that includes one or more symbols for channel estimation. A typical channel estimation symbol is generated at a transmitting node associated with the particular link using a pseudorandom number generator, obtained from a storage device, or generated using another suitable technique. In at least one embodiment of receiver 308, channel estimator 548 estimates the channel response based on received channel estimation symbols. Channel estimator 548 determines frequency domain equalizer coefficients for the link based on that estimated channel response (i.e., channel response estimate) and provides the frequency domain equalizer coefficients to FEQ 546 for use during data demodulation and decode sequences.

In a typical OFDM system, a transmitter oscillator frequency and subcarrier frequencies are related by integers. A technique for synchronizing subcarriers at the receiver to subcarriers generated at a transmitting node uses at least one frequency offset determination during an acquisition interval (e.g., coarse and fine frequency offset determinations). For example, a coarse frequency offset determination technique may resolve offsets greater than ½ of the subcarrier spacing, and fine frequency offset determinations may resolve offsets up to ½ of the subcarrier spacing. In at least one embodiment of receiver 308, frequency offset and timing acquisition module 530 performs both coarse frequency acquisition and fine frequency acquisition to determine timing offsets and frequency offsets using known sequences received as part of a packet preamble. The coarse and fine frequency acquisition techniques use known symbols and require channel stationarity for the corresponding time interval. However, once the preamble of a packet is over, slight changes in the overall system may result in additional frequency offset. Accordingly, a carrier tracking module (e.g., carrier tracking module 550) implements a decision-directed, frequency tracking technique to determine frequency offsets for reliable data demodulation that compensates for the time-varying nature of carriers to achieve and maintain a target system performance level (e.g., target bit-error rate).

In at least one embodiment of receiver 308, during timing and frequency acquisition sequences, a gain control module (e.g., automatic gain control module 522) provides power adjustment signals to monotonically adjust analog gain of the RF receiver interface (e.g., RF receiver 312 of FIG. 3) using adjustments in a particular range and step size. Referring back to FIG. 5, in at least one embodiment of receiver 308, during timing and frequency acquisition sequences, the output of de-rotator 512 is stored in a storage device (e.g., buffer 528). The stored data is used to detect a preamble of a packet (e.g., using preamble detection module 526). In at least one embodiment, a frequency offset and timing acquisition module (e.g., frequency offset and timing acquisition module 530) generates an indication of a start of a symbol and an indication of a frequency offset for use by the receiver for recovery of subsequent received symbols (e.g., timing interpolator 510, de-rotator 512, and cyclic prefix removal module 514).

Still referring to FIG. 5, a packet type detection module (e.g., packet type detector 556) detects the presence of one or more known sequences in a sequence of received samples by cross-correlating the received samples with each of a plurality of predetermined packet identification sequences or by using a matched filtering technique based on the entirety of each of the possible predetermined packet identification sequences. However, the channel may sufficiently distort the received signal to result in unreliable detection of the packet identification sequence using those typical cross-correlation or matched filtering techniques. The receiver may then improperly process the contents of the packet, which degrades system performance. A technique for detecting the presence of a packet identification sequence in a sequence of received samples uses the structure of the packet identification sequence to facilitate detection.

Referring to FIG. 6, an exemplary packet (e.g., packet 601, 602, 604, or 608) includes a preamble portion and a payload portion. In an exemplary communications network, only some of the packets include a packet identification sequence (i.e., packet identification field) in the preamble. Note that in other embodiments of the communications network, this field is always present in the preamble. The packet identifier field, when present, includes a predetermined packet identification sequence, which is one of a plurality of predetermined packet identification sequences (e.g., packet identification sequence 1 and packet identification sequence 2) that identifies a type of the packet defined by the associated communications protocol implemented by the network. For example, the packet identifier field is used only in link access control packets to distinguish between media access plan packets (i.e., packets sent by a network controller to all other nodes of the network that indicate transmission opportunities on the network and include associated information) and beacon packets (i.e., packets transmitted by the network controller to the other nodes to detect the presence of the network and facilitate admission to the network) with relatively high accuracy.

Each predetermined packet identification sequence for an exemplary protocol includes a first predetermined sequence (predetermined sequence 610), a null sequence (e.g., null sequence 612), and one of a plurality of identification sequences (e.g., identification sequence 616 or identification sequence 618). Predetermined sequence 610 is a short sequence (e.g., 30 samples) of samples of a pseudorandom sequence. Null sequence 612 corresponds to a transmission of zero samples (e.g., 32 samples). Identification sequence 616 and identification sequence 618 are distinct pseudorandom sequences of samples (e.g., 64 samples) that are uncorrelated with each other and correspond to distinct packet types. Sequence detection techniques described herein apply to detection of other sequences of samples that include a sequence of non-zero samples, a sequence of null (i.e., zero or silence) samples, and a sequence of known, non-zero samples.

Referring to FIGS. 5 and 7, in at least one embodiment, a sequence detection module (e.g., packet type detector 556), determines if a packet identification field has been detected by using the two consecutive search windows to detect the start of the null sequence in a received sequence of samples. Packet type detector 556 generates energy estimates for the received samples in each of the two consecutive search windows. For example, if each of the two consecutive windows is two samples wide, and samples $X_0, X_1, X_2, \ldots, X_k$, are received in order where k increases sequentially with time, the first window is used to compute energy estimate $E_{1,1}$ and the second window is used to compute energy estimate $E_{2,1}$. First energy estimates $E_{1,1}$ and $E_{2,1}$ are each based on non-overlapping consecutive samples (e.g., $E_{1,1}$ is based on samples $X_2$ and $X_3$, and $E_{2,1}$ is based on samples $X_0$ and $X_1$). Second energy estimates $E_{1,2}$ and $E_{2,2}$ are based on samples $X_3$ and $X_4$, and samples $X_1$ and $X_2$, respectively, third energy estimates $E_{1,3}$ and $E_{2,3}$ are based on $X_4$ and $X_5$, and $X_2$ and $X_3$, respectively, etc. Note that in at least one embodiment of packet type detector 556, the window width is programmable and may vary (e.g., based on packet format, target performance, and/or channel characteristics).

Figure 8:
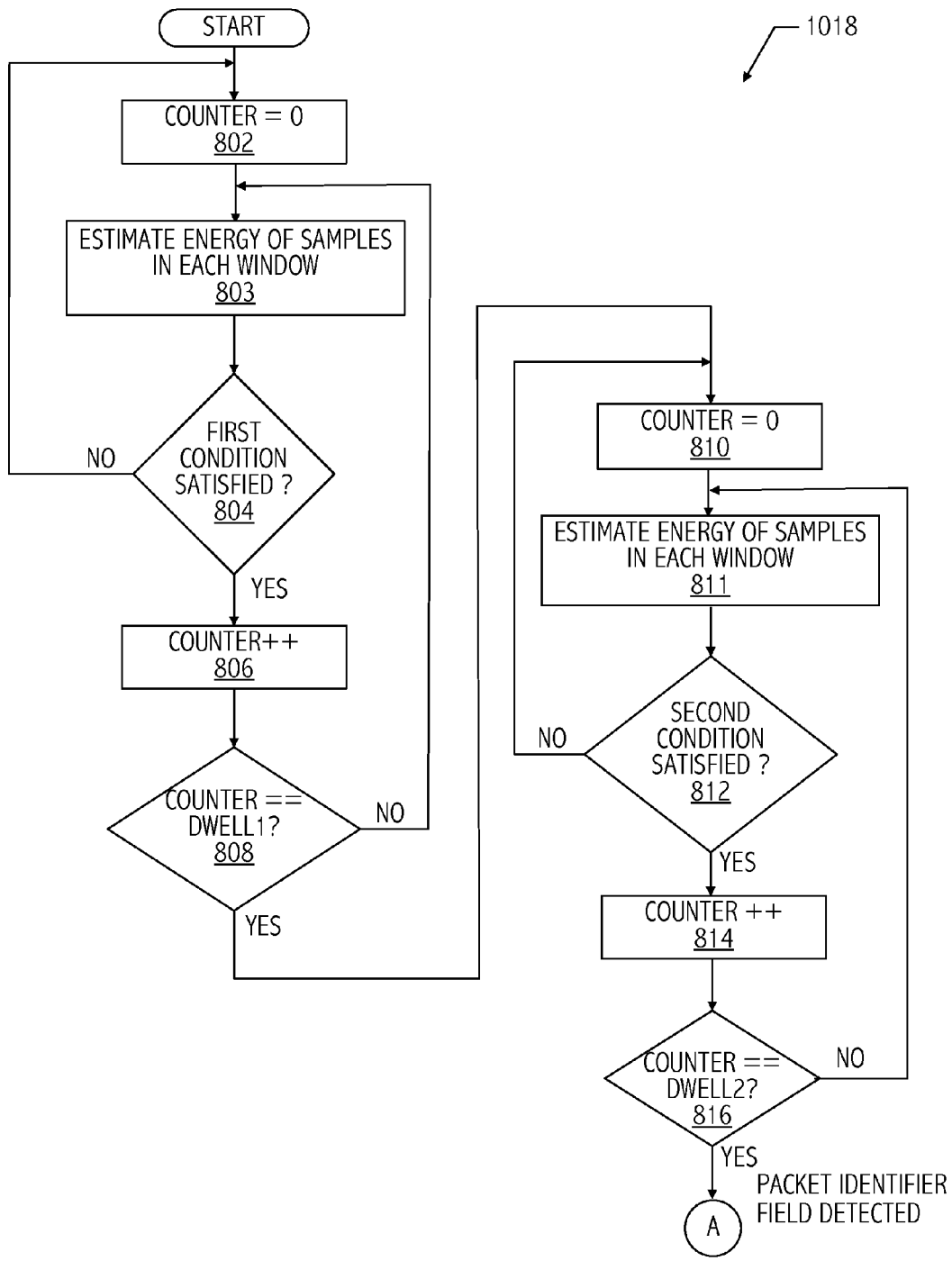
FIG. 8 illustrates information and control flows for detecting presence of a packet identifier sequence in a received packet consistent with at least one embodiment of the invention.
Figure 10:
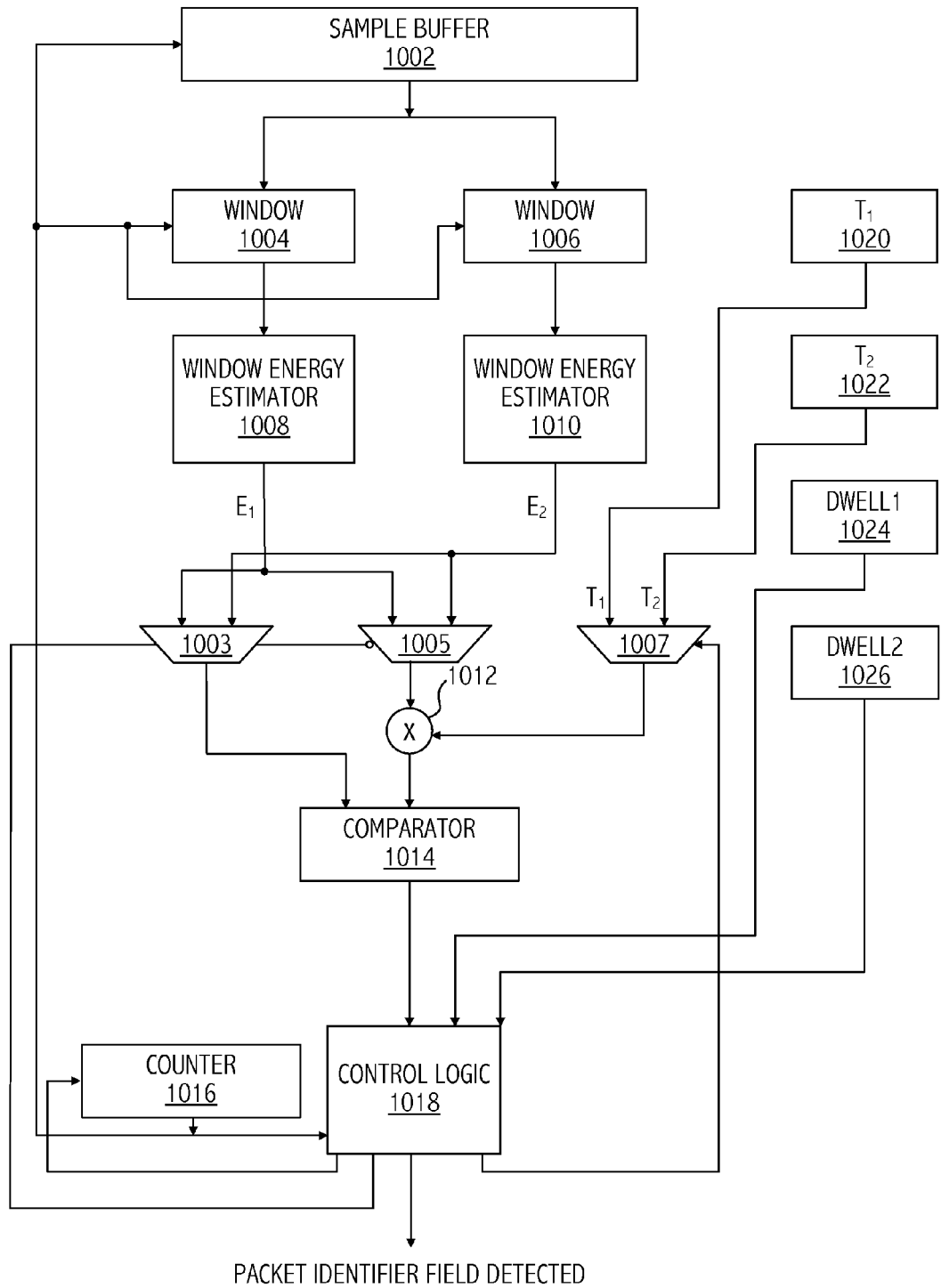
FIG. 10 illustrates a functional block diagram of a portion of a packet identification sequence detector consistent with at least one embodiment of the invention.

Referring to FIGS. 8 and 10, in at least one embodiment, packet type detector 556 includes control logic (e.g., control logic 1018) and associated circuitry to detect receipt of a packet identification field by using the two search windows described above to detect the null sequence in a received sequence of samples. For example, control logic 1018 initializes a counter (e.g., counter 1016) to a starting value (e.g., '0') (802). In at least one embodiment of packet type detector 556, control logic 1018 initializes counter 1016 in response to detection of a preamble as indicated by a coarse timing acquisition for a packet and packet type detector 556 does not execute otherwise. Techniques for detecting a preamble of a packet are described in co-pending application Ser. No. 13/324,217, filed Dec. 13, 2011, entitled "Coarse Timing Acquisition," naming Amit Ranjan Dubey et al. as inventors, which application is hereby incorporated by reference. However, in other embodiments, packet type detector 556 operates independently of any other preamble detection techniques.

Control logic 1018 configures window energy estimators (e.g., window energy estimator 1008 and window energy estimator 1010) to receive corresponding received samples. These samples may be provided by any suitable technique. In at least one embodiment, packet type detector 556 provides the samples to the energy estimators using windowing circuits (e.g., window 1004 and window 1006), which provide samples of the received signal corresponding to a particular window and counter value to the window energy estimators based on selected outputs of sample buffer 1002. In at least one embodiment, packet type detector 556 provides the samples to the energy estimators directly from the output of sample buffer 1002. Those direct access embodiments exclude windowing circuits window 1004 and window 1006.

Window energy estimator 1008 and window energy estimator 1010 generate an energy estimate for each window ($E_1$ and $E_2$, respectively) (803). The energy estimate may be based on an average of the energy of the samples included by the window and is generated by summing squares of the magnitudes of the samples (which are complex numbers having real and imaginary values) in the window and dividing the sum by the number of samples in the window. In other embodiments, window energy estimator 1008 and window energy estimator 1010 estimate the energy based on a total energy of the samples included by the particular window and is generated by summing squares of the magnitudes of the samples in the window. In other embodiments of window energy estimators 1008 and 1010, other energy estimate techniques are used.

Packet type detector 556 configures select circuits 1003, 1005, and 1007 and multiplier 1012 to provide suitable values for comparison to comparator 1014, which generates an indication of a sequence transition based on the comparison. In at least one embodiment, packet type detector 556 computes the ratio of $E_1$ to $E_2$ and compares that ratio to a first threshold energy ratio (e.g., $T_1$ stored in storage element 1020) (804). In other embodiments, packet type detector 556 computes the product of the energy estimate for the second window ($E_2$) and the first threshold energy ratio (e.g., $E_2 \times T_1$) and compares the energy estimate for the first window ($E_1$) to that product (804). In at least one embodiment, packet type detector 556 computes the ratio of $E_2$ to $E_1$ and compares that ratio to a first threshold energy ratio that is calibrated for that comparison. In other embodiments, packet type detector 556 computes the product of the energy estimate for window 1004 and the first threshold energy ratio (e.g., $E_1 \times T_1$) and compares the energy estimate for window 1006 to that product (804). In yet other embodiments of packet type detector 556, other conditions based on energy estimates for the samples of windows 1004 and 1006 are evaluated to detect a transition of the sequence of received samples from a first sequence of non-zero samples to received samples corresponding to a null sequence.

In general, when both windows of samples include received samples corresponding to transmission of a non-zero sequence, the ratio of energies in the first and second windows is approximately one (i.e., $E_1/E_2 \approx 1$ and $E_2/E_1 \approx 1$). When the first window begins to include the zero samples, the ratio of $E_1$ to $E_2$ drops below one and continues to drop until $E_1$ includes only received samples corresponding to transmission of a null sequence. Note that the energy of the received samples corresponding to transmission of a null sequence is typically greater than zero due to additive white Gaussian noise introduced by the channel or noise due to other channel impairments. Similarly, when the first window begins to include the zero samples, the ratio of $E_2$ to $E_1$ increases above one and continues to increase until $E_1$ includes only received samples corresponding to transmission of a null sequence.

If the first condition is not satisfied (804), then packet type detector 556 processes next windows of samples (e.g., the windows effectively slide by one sample to include a next consecutive later-received sample and exclude an earliest-received sample) (802). If the first condition is satisfied (e.g., $E_2 > E_1 \times T_1$ or $E_2/E_1 > T_1$), then the sequence transition is detected and control logic 1018 increments counter 1016 (806). Control logic 1018 compares the value of counter 1016 to a predetermined dwell period (e.g., DWELL1 of storage element 1024) (808). The dwell period corresponds to a number of times the first condition has been satisfied before confirming detection of the beginning of the null sequence. The dwell period may be programmable and serves to reduce or eliminate false detection of the null sequence. If the contents of counter 1016 are less than the count of the predetermined dwell period (808), then packet type detector 556 processes next windows of samples. If comparison of the contents of counter 1016 to the predetermined dwell period indicates that the first condition has been satisfied for the predetermined dwell period (808), then control logic 1018 resets counter 1016 and begins to search for a transition from received samples corresponding to the null sequence to received samples corresponding to the known sequence of non-zero samples of the identification sequence (810). In other embodiments, no dwell period is used and counter 1016 and associated portions of the technique are excluded.

In general, when both windows of samples include only received samples corresponding to the null sequence, the energies of samples of the first and second windows are very small (approximately zero). When the first window begins to include received samples corresponding to the non-zero samples of the identification sequence, then the energy of the first window begins to increase substantially as compared to the energy of the second window, while the energy in the second window remains very small for a period of time equal to the window width. Accordingly, packet type detector 556 configures select circuits 1003, 1005, and 1007 and multiplier 1012 to provide values for comparison and generate an indicator of a second condition indicative of detection of the transition from received samples corresponding to the null sequence to received samples corresponding to the identification sequence (812). In at least one embodiment, control logic 1018 configures comparator 1014 to compare the energy in the first window to the product of a second threshold value (e.g., $T_2$ of storage element 1022) and the energy estimate for the second window ($E_2 \times T_2$) (812). In other embodiments, packet type detector 556 computes the product of the energy estimate for the second window ($E_1$) and the second threshold energy ratio (e.g., $E_1 \times T_2$) and compares the energy estimate for the second window ($E_2$) to that product (812). In at least one embodiment, packet type detector 556 computes the ratio of $E_1$ to $E_2$ and compares that ratio to a second threshold energy ratio that is calibrated for that comparison. In other embodiments, packet type detector 556 computes the product of the energy estimate for window 1004 and the first threshold energy ratio (e.g., $E_1 \times T_2$) and compares the energy estimate for window 1006 ($E_2$) to that product (812). In yet other embodiments of packet type detector 556, other conditions based on the samples of windows 1004 and 1006 are evaluated to detect a transition of the received sequence from received samples corresponding to the null sequence to received samples corresponding to a known, non-zero sequence.

If the second condition is not satisfied, then packet type detector 556 processes a next set of windows of samples (810). If the second sequence transition is detected (e.g., $E_1 > E_2 \times T_2$ or $E_1/E_2 > T_2$), then control logic 1018 increments counter 1016 (814). Control logic 1018 compares the value of counter 1016 to a second predetermined dwell period (e.g., DWELL2 of storage element 1026) (816). The second dwell period corresponds to a number of times the second condition is met before confirming detection of the end of the null sequence and the beginning of an identification sequence (e.g., identification sequence 616 or 618). The dwell period may be programmable and serves to reduce or eliminate false detection of the end of the null sequence and false detection of the beginning of the identification sequence. If the contents of counter 1016 are less than the count of the second predetermined dwell period (816), then packet type detector 556 processes the next windows of samples (811). If comparison of the contents of counter 1016 to the second predetermined dwell period indicate that the second condition has been met for the second predetermined dwell period (816), then control logic 1018 generates an indicator that a packet identification field has been detected, which also indicates a location of a first sample of the identification sequence.

A typical channel has an asymmetric impulse response, which results in different energy levels and different rates of change in energy levels in received samples corresponding to the beginning of the received null sequence and in samples at the end of the received null sequence. In addition, the channel introduces additive white Gaussian noise into the received signal, which reduces the difference in the energy of received samples corresponding to a non-zero sequence and the energy of received samples corresponding to a null sequence. Accordingly, packet type detector 556 uses two thresholds. e.g., $T_1$ and $T_2$, to detect the beginning of the null sequence and the beginning of the identification sequence, respectively. However, in other embodiments of packet type detector 556, a single threshold level is used to detect the beginning of the null sequence and the beginning of the identification sequence. In addition, note that the use of two windows of samples, each having a width of M, amplifies the difference in energy of the received samples corresponding to a non-zero sequence and the energy in received samples corresponding to the null sequence and detects this difference earlier, as compared to embodiments of a packet identification sequence detector that use a single window of width 2×M. In at least one embodiment of packet type detector 556, the window width, M, is programmable and a user or other module may select a value for M that is based on the channel impulse response or other suitable criteria. Although FIGS. 8 and 10 illustrate embodiments of packet type detector 556 that perform a particular order of operations using a particular combination of hardware modules, other embodiments of packet type detector 556 may use other sequences of operations allowed by data dependencies and combinations of hardware modules to detect a transition of the sequence of received samples from a first sequence of known, non-zero samples to received samples corresponding to a null sequence and to detect a transition of the sequence of received samples from a sequence of received samples corresponding to a null sequence to received samples corresponding to a second sequence of known, non-zero samples.

Figure 9:
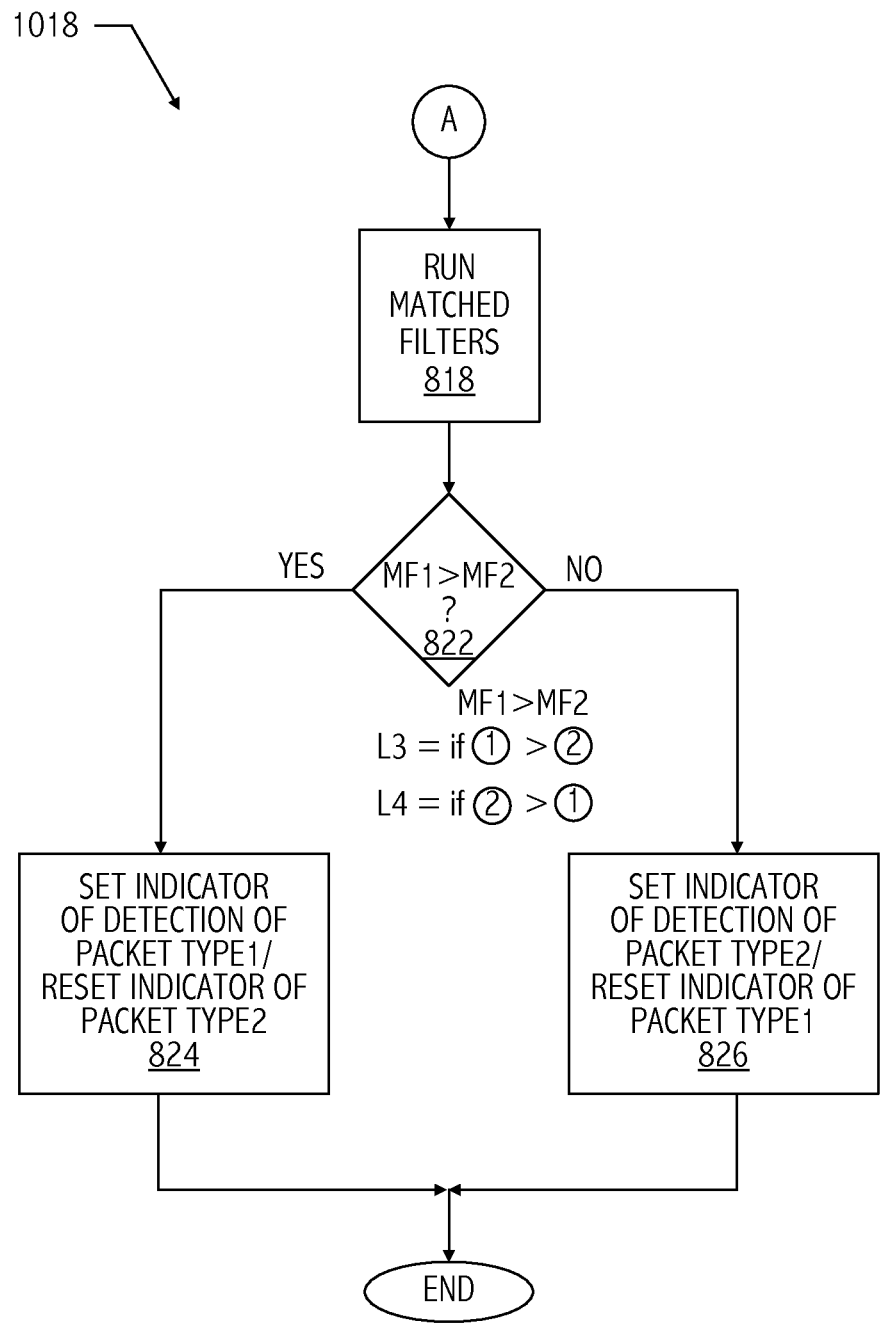
FIG. 9 illustrates information and control flows for detecting a packet type consistent with at least one embodiment of the invention.
Figure 11:
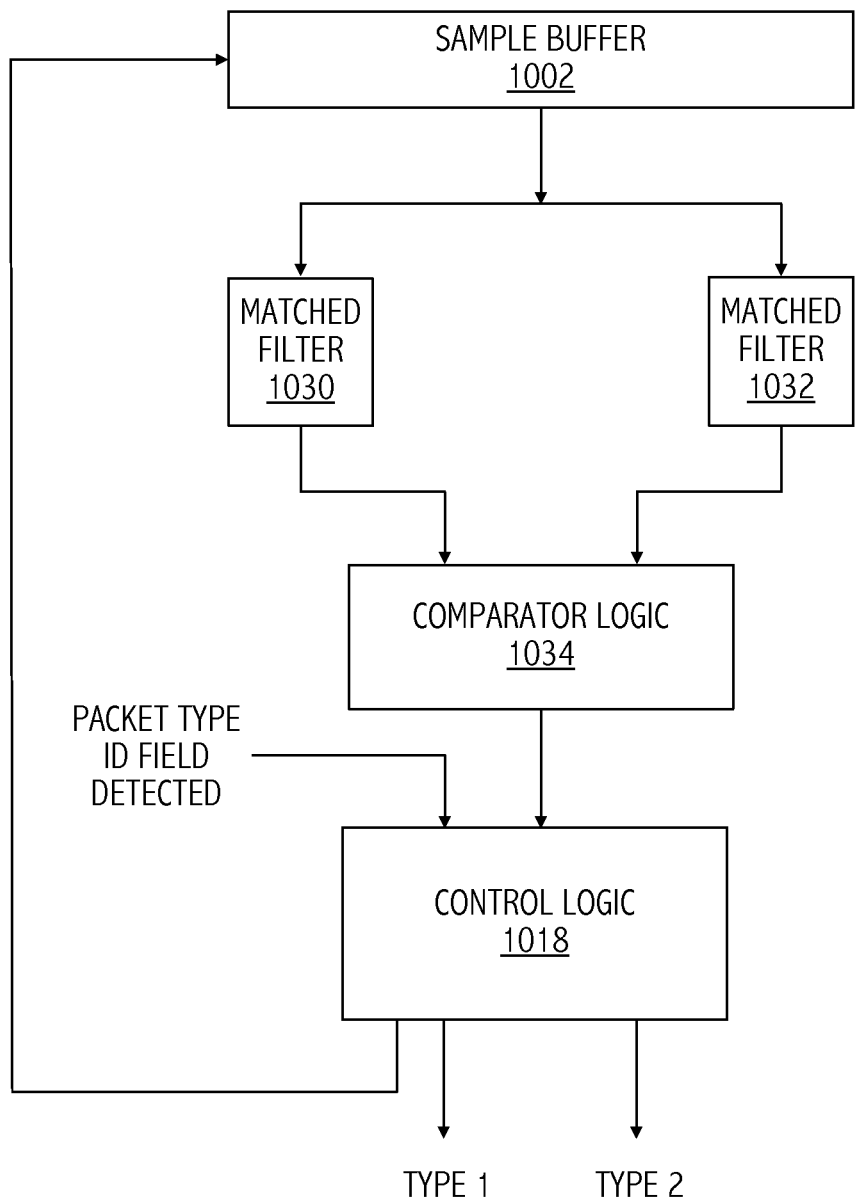
FIG. 11 illustrates a functional block diagram of a portion of a packet identification sequence detector consistent with at least one embodiment of the invention.

Referring to FIGS. 9 and 11, in response to detection of the packet identification field in the predetermined sequence, packet type detector 556 proceeds to detect a particular type of the received packet based on that field. In response to detection of the packet identification field, control logic 1018 configures packet type detector 556 to filter at least some samples of the packet identification sequence (e.g., packet identification field samples received from sample buffer 1002) using each of a plurality of matched filters (818). In other embodiments of packet type detector 556, rather than use matched filters, other signal processing techniques are used (e.g., cross-correlation). Note that in at least one embodiment of packet type detector 556, matched filter 1030 and matched filter 1032 are based on only the identification sequence (e.g., identification sequence 616 or identification sequence 618) of the packet identification field and not on predetermined sequence 610 or null sequence 612. However, in other embodiments of packet type detector 556, the matched filters may operate on a number of samples equal to the total number of samples of the identification sequence 616 and null sequence 612 or the total number of samples in the entire packet identification field (e.g., the first predetermined sequence 610, the null sequence 612, and the identification sequence 616). Note that in embodiments that operate on a number of samples equal to the total number of samples of the identification sequence 616 and null sequence 612 or the total number of samples in the entire packet identification field, the corresponding matched filters include zero-valued coefficients. Application of the zero-valued coefficients to samples will not change the matched filter output, regardless of the values of those samples. Thus, a packet detection technique that uses only matched filtering (i.e., without the techniques described above with regard to FIGS. 8 and 10 and an indicator thereof) will not detect the null sequence and is not as robust as a packet detection technique that is based on the packet type identification field detection indicator described above with regard to FIGS. 8 and 10.

Packet type detector 556 includes one matched filter for each predetermined identification sequence (e.g., matched filter 1030 and matched filter 1032 for detecting identification sequence 616 and identification sequence 618, respectively). Since the predetermined identification sequences are uncorrelated with each other, received samples of an identification sequence in a particular packet identification sequence field will result in a matched filter output that is much greater for the matched filter corresponding to that particular predetermined identification sequence that was received in the packet identification sequence field as compared to outputs of the other matched filters. Comparator logic 1034 compares the outputs of the matched filters to each other to determine which matched filter had the greatest output value, indicating a high correlation between the samples of the identification sequence and an identification sequence associated with that matched filter (822). Control logic 1018 generates an indicator of the type of the received packet based on that comparison and provides that signal to other portions of the receiver to facilitate processing of the received packet. Accordingly, packet type detector 556 sets an indicator of the packet type corresponding to the matched filter with the greatest output and resets or maintains in a reset state, indicators of any other packet types. For example, if only two predetermined identification sequences are used by a particular communications system, then if the output of matched filter 1030 is greater than the output of matched filter 1032, then control logic 1018 sets an indicator of packet type 1 and resets or maintains in reset, an indicator of packet type 2 (824). Similarly, if the output of matched filter 1032 is greater than the output of matched filter output 1030, then control logic 1018 sets an indicator of packet type 2 and resets, or maintains in reset, an indicator of packet type 1 (826). Although the packet type detector 556 is described in embodiments that detect only two different packet types, the techniques described herein apply to sequence detectors for any number of predetermined identification sequences and corresponding sequence types. Although FIGS. 9 and 11 illustrate embodiments of packet type detector 556 that perform a particular order of operations allowed by data dependencies using a particular combination of hardware modules, other embodiments of packet type detector 556 may use other sequences of operations and combinations of hardware modules to generate a packet type indicator.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention by executing the instructions on a computer. The instructions/data may be related to hardware, software, firmware or combinations thereof.

The description of the invention set forth herein is illustrative, and is not intended to limit the scope of the invention as set forth in the following claims. For example, while the invention has been described in an embodiment in which a receiver receives communications over a channel including coaxial cable, one of skill in the art will appreciate that the teachings herein can be utilized with devices consistent with other OFDM communications protocols and/or other wireline or wireless channels. Variations and modifications of the embodiments disclosed herein, may be made based on the description set forth herein, without departing from the scope and spirit of the invention as set forth in the following claims.

What is claimed is:

1. A method comprising:
generating an indicator of detection of a predetermined sequence in a sequence of received samples based on a first energy estimate corresponding to a first sequence of received samples, a second energy estimate corresponding to a second sequence of received samples, a first threshold level, a second threshold level, and a plurality of predetermined sequences, the generating comprising:
detecting a null sequence in the sequence of received samples based on the first threshold level, the first energy estimate, the second energy estimate, and a first guard period;
detecting the predetermined sequence in the received samples, based on detection of the null sequence, the first energy estimate, the second energy estimate, the second threshold level, and a second guard period;
generating a first matched filter output based on samples of a packet identification sequence and a first predetermined sequence of the plurality of predetermined sequences, the first predetermined sequence corresponding to a first of a plurality of packet types; and generating a second matched filter output based on the samples of the packet identification sequence and a second predetermined sequence of the plurality of predetermined sequences, the second predetermined sequence corresponding to a second of the plurality of packet types, wherein the detecting the predetermined sequence is further based on a comparison of the first matched filter output to the second matched filter output.

2. The method, as recited in claim 1, further comprising:
generating a first sequence of received samples by windowing the sequence of received samples using a first rectangular window; and
generating a second sequence of received samples by windowing the sequence of received samples using a second rectangular window.

3. The method, as recited in claim 1, further comprising:
detecting the packet identification sequence by detecting a transition of the received samples from a first sequence of non-zero samples in the sequence of the received samples to the null sequence in the sequence of the received samples based on the first threshold level, the first energy estimate, the second energy estimate, and the first guard period.

4. The method, as recited in claim 1, wherein the indicator indicates a packet type of a packet including one of the plurality of predetermined sequences, the packet type being one of a corresponding plurality of packet types.

5. The method, as recited in claim 1, wherein the predetermined sequence includes the null sequence and one of the plurality of predetermined sequences.

6. The method, as recited in claim 5, wherein the predetermined sequence includes an additional predetermined sequence prior to the null sequence.

7. The method, as recited in claim 1, wherein the first and second threshold levels are predetermined threshold ratios of first and second energy levels.

8. The method, as recited in claim 3, wherein detecting the null sequence comprises determining the first energy estimate is less than a corresponding second energy estimate times a first predetermined ratio over a first guard period and generating an indicator thereof.

9. The method, as recited in claim 3, wherein detecting the packet identification sequence is in response to detecting a transition of the received samples from the null sequence to the first predetermined sequence using the first energy estimate, the second energy estimate, the second threshold level, and the second guard period.

10. The method, as recited in claim 9, wherein the packet identifications sequence is detected further in response to detecting the null sequence in response to determining that the first energy estimate is greater than the second energy estimate times a second predetermined ratio over the second guard period and generating an indicator thereof.

11. The method, as recited in claim 1, wherein the first predetermined sequence is uncorrelated with the second predetermined sequence, and the first predetermined sequence corresponds to a first packet type of a plurality of packet types and the second predetermined sequence corresponds to a second packet type of the plurality of packet types.

12. An apparatus comprising:
a control circuit configured to generate an indicator of detection of a predetermined sequence in a sequence of received samples based on a first energy estimate corresponding to a first sequence of received samples, a second energy estimate corresponding to a second sequence of received samples, a first threshold level, a second threshold level, and a plurality of predetermined sequences, the control circuit being configured to:
detect a null sequence in the sequence of received samples based on the first threshold level, the first energy estimate, the second energy estimate, and a first guard period;
detect the predetermined sequence in the received samples, based on detection of the null sequence, the first energy estimate, the second energy estimate, the second threshold level, and a second guard period;
a first matched filter configured to generate a first matched filter output based on samples of a packet identification sequence and a first predetermined sequence of the plurality of predetermined sequences, the first predetermined sequence corresponding to a first of a plurality of packet types; and
a second matched filter configured to generate a second matched filter output based on the samples of the packet identification sequence and a second predetermined sequence of the plurality of predetermined sequences, the second predetermined sequence corresponding to a second of the plurality of packet types,
wherein the control circuit is configured to detect the predetermined sequence further based on a comparison of the first matched filter output to the second matched filter output.

13. The apparatus, as recited in claim 12, further comprising:
a first energy estimator configured to generate the first energy estimate of energy in a first window of the received samples; and
a second energy estimator configured to generate the second energy estimate of energy in a second window of the received samples.

14. The apparatus, as recited in claim 12, wherein the indicator indicates a packet type of a packet including one of the plurality of predetermined sequences, the packet type being one of a corresponding plurality of packet types.

15. The apparatus, as recited in claim 12, wherein the predetermined sequence includes the null sequence and one of the plurality of predetermined sequences.

16. The apparatus, as recited in claim 15, wherein the predetermined sequence includes an additional predetermined sequence prior to the null sequence.

17. The apparatus, as recited in claim 12, wherein the indicator is based on a comparison of a ratio to one of a first threshold level and a second threshold level.

18. The apparatus, as recited in claim 12, wherein the first indicator is based on a comparison of the first energy estimate to a product of the second energy estimate and one of a first threshold level and a second threshold level.

19. An apparatus comprising:
means for generating an indicator of detection of a predetermined sequence in a sequence of received samples based on a first energy estimate corresponding to a first sequence of received samples, a second energy estimate corresponding to a second sequence of received samples, a first threshold level, a second threshold level, and a plurality of predetermined sequences, the generating comprising:
detecting a null sequence in the sequence of received samples based on the first threshold level, the first energy estimate, the second energy estimate, and a first guard period;
detecting the predetermined sequence in the received samples, based on detection of the null sequence, the first energy estimate, the second energy estimate, the second threshold level, and a second guard period;

means for generating a first matched filter output based on samples of a packet identification sequence and a first predetermined sequence of the plurality of predetermined sequences, the first predetermined sequence corresponding to a first of a plurality of packet types; and means for generating a second matched filter output based on the samples of the packet identification sequence and a second predetermined sequence of the plurality of predetermined sequences, the second predetermined sequence corresponding to a second of the plurality of packet types, wherein the detecting the predetermined sequence is further based on a comparison of the first matched filter output to the second matched filter output.

* * * * *